United States Patent [19]

Hammer et al.

[11] Patent Number: 4,940,615

[45] Date of Patent: Jul. 10, 1990

[54] TUBULAR FOODSTUFF CASING MADE OF CELLULOSE HYDRATE, IN PARTICULAR SYNTHETIC SAUSAGE CASING

[75] Inventors: Klaus-Dieter Hammer, Mainz; Hermann Winter, Wiesbaden, both of Fed. Rep. of Germany

[73] Assignee: Hoechst Aktiengesellschaft, Frankfurt am Main, Fed. Rep. of Germany

[21] Appl. No.: 313,037

[22] Filed: Feb. 21, 1989

[30] Foreign Application Priority Data

Mar. 4, 1988 [DE] Fed. Rep. of Germany ........ 3807070

[51] Int. Cl.$^5$ .............................................. A22C 13/00
[52] U.S. Cl. ................... 428/34.8; 138/118.1; 426/105; 426/135; 426/532
[58] Field of Search ............... 428/34.8, 907; 138/118.1; 426/105, 135, 532

[56] References Cited

U.S. PATENT DOCUMENTS

| | | | |
|---|---|---|---|
| 3,956,539 | 5/1976 | O'Brien, Jr. | 427/358 |
| 4,563,376 | 1/1986 | Hammer et al. | 428/36 |
| 4,662,403 | 5/1987 | Hammer et al. | 138/118.1 |
| 4,664,861 | 5/1987 | Pritikin et al. | 264/173 |
| 4,666,750 | 5/1987 | Hammer et al. | 428/36 |

FOREIGN PATENT DOCUMENTS 0247437 12/1987 European Pat. Off. .
2338650 8/1977 France .

*Primary Examiner*—James Seidleck
*Attorney, Agent, or Firm*—Foley & Lardner, Schwartz, Jeffrey, Schwaab, Mack, Blumenthal & Evans

[57] ABSTRACT

The tubular foodstuff casing, in particular the synthetic sausage casing, made of cellulose hydrate comprises an external covering or impregnation comprising a fungicidal heterocyclic compound, in particular a benzimidazole or isothiazolone derivative substituted in the 2-position, which can be used, if desired, in admixture with glycerol monolaurate. The coating prevents infestation of the casing by molds, in particualr when it is stored in the moist state.

25 Claims, No Drawings

TUBULAR FOODSTUFF CASING MADE OF CELLULOSE HYDRATE, IN PARTICULAR SYNTHETIC SAUSAGE CASING

BACKGROUND OF THE INVENTION

The invention relates to a tubular foodstuff casing, in particular synthetic sausage casing made of cellulose hydrate containing a covering layer on the outside which contains a fungicide.

The difficulty with foodstuff casings made of cellulose hydrate is that during storage before being filled with the foodstuff they are infested by undesired mold and other microorganisms, thus making them useless. The growth of the mold is particularly accelerated if the foodstuff casings before being processed are stored with an increased humidity content which is required to guarantee sufficient flexibility of the casing.

To prevent this disadvantageous effect, it is known to apply glycerol monolaurate as a fungicide on the external surface of cellulose tubes (EP-A No. 0,141,066, U.S. Pat. No. 4,662,403). Compared with water-soluble fungicidal compounds, this compound has the advantage of still being present in a sufficient amount on the external surface even after the casing has been processed, in particular even after the hot water treatment of the sausage casing filled with the sausage meat. This fungicide is also used to protect the sausages, which are enclosed in a secondary packaging, for example in a plastic bag and have a sausage skin made of cellulose, from the undesired infestation of the cellulose layer by mold. In a further development of this known coating, the covering layer additionally contains, apart from glycerol monolaurate, potassium sorbate which is bound to the surface of the sausage casing made of fiber-reinforced cellulose by means of crosslinked protein (casein/glyoxal) (DE-A No. 3,606,195, U.S. Pat. No. 4,666,750). This coating has the additional function of preventing the degradation of cellulose by cellulolytic enzymes. However, in a recently published alternative, the potassium sorbate is immobilized together with epichlorohydrin/polyamine/polyamide resin on the tube surface and is preferably present on the tube inner surface, while glycerol monolaurate is present on the tube outer surface (EP-A No. 0,247,437). According to this proposal, premoistened sausage casings made of fiber-reinforced cellulose, which are processable without further watering, are intended to be protected against infestation by mold.

It is true that these known formulations still have sufficient action after simmering or boiling of the tubular casings filled with pasty foodstuffs. However, it was found that in the case of long lasting and intensive action of mold spores even these agents do not give sufficiently safe protection against infestation of the cellulose casing by mold. If, for example, long-keeping sausages are dried in the air for several weeks next to those types of salami which on the outer surface are populated by noble mold, the long-keeping sausage casings grow molds in the course of time caused by the constant action of the mold spores emanating from the types of salami even if they have been treated with one of the above-mentioned fungicide external coatings. Even sausages packaged into plastic bags are particularly susceptible to infestation by mold spores under unfavorable conditions of storage (high temperature and humidity) so that the action of the known fungicides may not be sufficient under certain circumstances.

SUMMARY OF THE INVENTION

Accordingly, it is an object of the present invention to provide a tubular foodstuff casing with a fungicidal coating or impregnation which absolutely prevents an infestation of said foodstuff casings with mold even under extreme storage conditions.

In accomplishing the foregoing objective, there has been provided, in accordance with one aspect of the present invention, a tubular cellulose hydrate foodstuff casing comprising an external covering layer or an impregnation, said layer or impregnation comprising a fungicidal heterocyclic compound which comprises (a) a benzimidazole substituted in the 2-position, (b) an isothiazolone substituted at the nitrogen atom or at at least one carbon atom by an alkyl group or at at least one carbon atom by a halogen, or (c) a substituted or unsubstituted isothiazolone containing a fused aromatic ring.

In accordance with another aspect of the present invention there is provided a method of preventing infestation of tubular foodstuff casings with mold which comprises the step of providing a sausage casing comprising cellulose with an external covering layer or impregnation comprising at least one of the recited fungicidal heterocyclic compounds.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be without departing from the spirit thereof, and the invention includes all such modifications.

DETAILED DESCRIPTION OF THE PREFERRED EMBODIMENTS

Suitable benzimidazole compounds are in particular carbendazim (formula l), thiabendazole (formula m), benomyl (formula n) and fuberidazole (formula o). Suitable isothiazolone derivatives and possibly also the benzoisothiazolone derivatives contain at least one alkyl group R on the N atom (formula a, d, e, f, h, i, j, k) and/or at least on one of the two carbon atoms of the five-membered ring (formula b, c, d, e, g, h, formula b and d: hydrogen replaced by R) or on the aromatic ring (formula j, k). Introduction of a halogen atom, in particular a chlorine atom, in particular on the carbon atom adjacent to the sulfur atom (formula f, g, h, formula f: R replaced by hydrogen) or by two chlorine atoms (formula f: hydrogen replaced by chlorine, formula g: R replaced by chlorine) on both carbon atoms of the five-membered ring on the one hand increases the fungicidal action, and on the other hand also reduces the water solubility of the fungicide. The compounds having the formulae a to k are, for the sake of simplicity, designated in the description and in the claims as isothiazolone compounds.

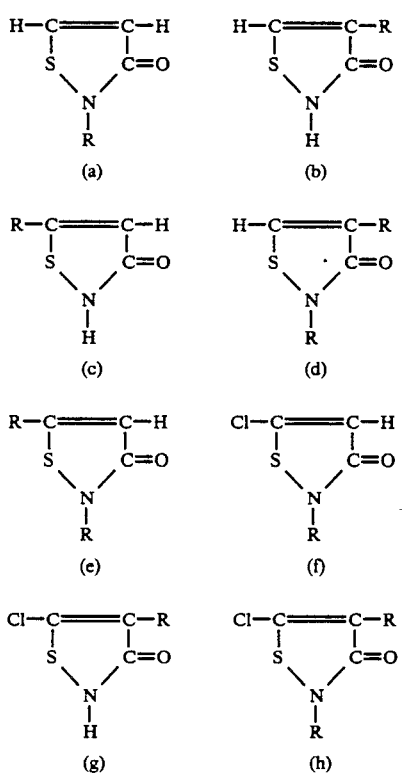

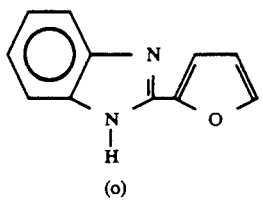

The external coating forms a covering layer which is not necessarily continuous and uninterrupted. Impregnation of the cellulose is also sufficient, in which case the fungicides have more or less penetrated the casing material. Of the compounds mentioned, those of the formulae a, c, f and i are particularly preferred, benzoisothiazolone (formula i, R=H) preferably being used together with another fungicide and/or cationic resin. Alkyl group R is an aliphatic cycloalkyl radical having 3 to 12 carbon atoms, but is preferably a straight-chain, in particular unbranched, hydrocarbon radical which is mono-unsaturated or polyunsaturated (alkenyl radical), but is preferably saturated. The number of carbon atoms, in particular of the straight-chain N-alkyl radical, should not exceed 20 carbon atoms, since otherwise the substance becomes wax-like and can be applied only with difficulty. The longest practicable chain length for the N-alkyl radical has proven to be the stearyl radical ($C_{18}H_{37}$) However, the N-alkyl radical usually comprises 14 carbon atoms or less, since in this case the fungicidal action is higher. Readily accessible compounds contain, for example, 12 or 8 carbon atoms in the straight-chain alkyl radical of the nitrogen atom.

However, it is also possible for the alkyl radical to contain fewer than 8 carbon atoms, for example 1 to 5 carbon atoms, if thereby for the particular type of sausage sufficient adhesion of the fungicide to the sausage skin during the preparation of the sausage is guaranteed or additionally a further fungicide, in particular a benzimidazole compound or glycerol monolaurate, and/or a water-insoluble cationic resin is used as a binder.

The alkyl groups R which are present on one of the two carbon atoms of the isothiazolone ring are preferably aliphatic straight-chain, unbranched hydrocarbon radicals having 1 to 4 carbon atoms, in particular methyl or ethyl radicals.

If more than one alkyl group is present, the sum of the carbon atoms of the alkyl groups is also about 20 at the most, preferably it is smaller than/equal to 16, in particular smaller than/equal to 12.

If benzoisothiazolone of the formula i is used, R on the nitrogen atom is replaced by hydrogen or R is a small alkyl group on the nitrogen atom (formula i, k) and/or on the benzene ring (formula j, k), in particular having 1 to 4 carbon atoms, for example methyl, ethyl or propyl radicals, the alkyl group ensuring a particularly good adhesion of this compound on the outside of the sausage casing. Likewise, if isothiazolone derivatives substituted by chlorine are used, smaller alkyl groups are present on the nitrogen atom and/or on the free carbon atom of the isothiazolone ring, for example $C_1$- to $C_{12}$-alkyl groups or $C_3$- to $C_8$-cycloalkyl groups, in particular $C_1$- to $C_8$-alkyl or -cyclohexyl radicals on the nitrogen atom. If these compounds are too water-soluble, they are also used together with other fungicides, in particular a benzimidazole compound or glycerol monolaurate, and/or a water-insoluble cationic resin as a binder.

Isothiazolones and benzoisothiazolones containing shorter hydrocarbon radicals have the advantage of having a higher fungicidal activity, which might be explained by their somewhat higher water-solubility. However, this advantage is impaired by the fact that these compounds, when soaking the casings in water, are partially removed from the casing surface before the filling process and during the simmering of the finished sausage. Therefore, it is more favorable for some types of sausage to provide alkyl groups with an average chain length of 6 to 12 carbon atoms and slightly to increase the applied amount of these less soluble, but less active compounds, to achieve a comparable fungicidal effect.

Compounds which are particularly difficult to dissolve ($R=C_8$ to $C_{14}$) are used for sausage casings which, on their inner surface, have a gas and water barrier layer, for example made of vinylidene chloride mixed polymer and are used for simmering sausage types. Sausage casings for long-keeping sausage types, which are soaked in water before filling only for a short time and, after the sausage is finished, are, if desired, only smoked, however, preferably receive a fungicidal external coating by means of the more soluble but more effective substances.

For an optimum fungicidal activity of the heterocyclic compounds, there should be present a minimum amount of about 50 mg/m². Usually 80 to 200 mg/m² of fungicidal compound are used, it being necessary, regarding the upper limit, to heed the regulations of the foodstuff law. Therefore, in the individual case, it is inevitable to use reduced amounts of less than 20 or even 15 mg/m² of fungicidal heterocyclic compounds, the action of which can be increased by the addition of other fungicidal compounds.

To increase the fungicidal effect, the exterior coating may additionally comprise glycerol monolaurate (EP-A No. 0,141,066, page 4), which is present in the alpha-form as racemate and/or in the beta-form. This addition has the further advantage that the fungicidal heterocyclic compounds, preferably the isothiazolone compounds, in particular the benzimidazole compounds, are distributed more evenly on the tube surface and have better adhesion on the tube surface even if they are relatively readily water-soluble. The ratio of the amount of the fungicidal heterocyclic compound applied, in particular of the isothiazolone and/or benzimidazole compound, to the amount of the glycerol monolaurate applied is advantageously about 3:1 to 1:3, preferably 2:1 to 1:2. A particularly strong fungicidal effect can be achieved by a mixture of benzoisothiazolone compounds of the formula i, j or k, in particular of the formula i, R=hydrogen, and glycerol monolaurate.

In a further embodiment of the invention, the external coating of the foodstuff casing additionally contains a cured, water-insoluble cationic resin, for example a condensation product from protein, for example casein, with aldehyde, such as formaldehyde or glyoxal, or from urea or melamine with aldehyde. Preferably, the cationic resin is a condensation product from epichlorohydrin with polyamine, polyamide or polyaminopolyamide. The use of these resins for internal coatings of sausage casings is known, for example, from European Patent No. 0,088,308 (U.S. Pat. No. 4,563,376). The resin layer is applied together with the fungicide to the outside of the casing, thus embedding the fungicides in the resin layer. It is also possible to apply the resin layer in a second stage to the casing surface, thus forming in this case a covering on top of the initially applied fungicides. In both embodiments, the fungicidal action is maintained. The additional effect is a strongly reduced degradation of the cellulose by cellulolytic enzymes. The weight per unit area of the cationic resin applied is advantageously 50 to 300, in particular 80 to 200, mg/m².

The actual casing material consists of cellulose, specifically cellulose hydrate, which is also called regenerated cellulose or cellophane. The cellulose layer preferably contains a fiber reinforcement in its wall, for example consisting of paper made of hemp fibers, which is covered with cellulose on one or both surfaces. These sausage casings called fibrous skin are used in particular for high-diameter sausages.

The foodstuff casing is produced in a conventional manner, for example by the viscose process. In this process, a tube or a fiber web in the shape of a tube, for example made of paper or hemp fibers, is coated through an annular nozzle on the inner surface and/or outer surface with alkaline viscose solution and treated with an acid precipitating liquid, which causes the viscose to coagulate. The viscose solution may contain dye pigments required for the formation of a white or colored casing. To produce reinforcement-free cellulose casings, the viscose is extruded directly into the precipitating bath in the form of a tube. The resulting tube made of cellulose hydrate gel, which may be fiber-reinforced, is provided, before the drying, on its outside with the coating according to the invention. This is carried out in a customary manner, for example by soaking in a liquid bath, roller application or spraying. The concentration of the fungicidal heterocyclic compounds in the aqueous or alcoholic coating liquid is all together about 0.5 to 10, preferably 1 to 5, in particular 1.5 to 3.5, % by weight.

If, to reinforce the fungicidal action, glycerol monolaurate is additionally used, the content in the coating liquid is adjusted in accordance with the desired composition of the covering layer. Advantageously, the glycerol monolaurate is added to the coating liquid together with an emulsifier. Suitable emulsifiers and their customary amounts are described in EP-A No. 0,141,066.

Advantageously, the coating liquid additionally contains one or more plasticisers for the cellulose, in particular monohydric or polyhydric alcohols, such as, for example, glycerol, propanediol (propylene glycol) or ethanol or mixtures thereof in conventional amounts.

To improve the adhesiveness of the covering, one of the above-mentioned cationic resins in a still water-soluble form, which crosslinks in the final drying process and is converted into its water-insoluble form, is optionally added to the coating liquid. Suitable resin solutions are in particular aqueous epichlorohydrin/polyaminopolyamide solutions, which are commercially available. The concentration of these resin solutions is about 0.8 to 5, in particular 1 to 3, % by weight. Finally the drying process is carried out in which the water content is usually reduced down to values of about 7 to 15%

The invention is illustrated in more detail by the examples which follow.

EXAMPLE 1

A fiber tube (diameter 65 mm) provided on its outside with alkaline viscose solution (cellulose xanthate) is treated with acidic coagulating and precipitating liquid.

Before entering the dryer, the fiber-reinforced cellulose hydrate gel tube obtained is coated on the outside by being moved through an impregnating trough which contains an aqueous solution of the following composition:

30 g/l of glycerol monolaurate
95 g/l of benzoisothiazolone (formula i, R = H)
100 ml/l of glycerol The inside of the tube is filled with a 1 to 2% strength by weight aqueous solution of a conventional heat-curable cationic resin, which has the function of improving the adhesion between the casing and the sausage meat. The tube is pulled up so that excess coating solution on the outer surface and inner surface of the tube can run down.

The tube is then dried as usual in the inflated state and moistened to a water content of 7 to 12% by weight. The amount of the two fungicides applied to the external surface is about 800 mg/m$^2$, determined by gravimetry after dissolving it with methylene chloride. The percentages of the two fungicides are determined by UV spectroscopy by means of a previously drawn-up calibrating curve. The tube is divided into individual tube segments, which are tied at one end and filled with sausage meat of the salami type, and the open end of the sausage casing is sealed. The sausages obtained are allowed to mature by storing them for three months directly next to sausages having noble mold growth. Despite the proximity to the sausages provided with noble mold, no mold growth can be detected after the storage on the external surface of the sausage casing according to the invention.

This result is also confirmed by the following laboratory test:

1 bag (about 10 g) of commercially available pure-breed mold spores of "penicillium nalgiovense" is suspended in 200 ml of water. 1 ml of this suspension is evenly distributed on the external surface of a sausage casing segment (about 50 cm$^2$) cut along the longitudinal axis. After exposure for three months at 25° C./95-99% relative humidity, the sample is still free from molds.

EXAMPLE 2

A fiber tube (diameter 60 mm) provided on its outer surface and inner surface with alkaline viscose solution in a weight ratio of 4:6 is coated on its outside with propane-1,2-diol as solvent, after the viscose has been coagulated and regenerated to give cellulose hydrate gel. 24 g of N-octylisothiazolone (octyl = n-octyl) and 6 g of carbendazim per liter of solution are present as fungicides.

At the same time, the propanediol serves as plasticizer for the cellulose. A 0.3 to 0.7% strength by weight aqueous solution of heat-curable cationic resin is applied to the inner surface of the tube. During the subsequent drying of the tube, the cationic resin is cured and forms an immobilizing impregnation for an internal coating consisting of vinylidene chloride copolymer. After the tube has been dried, this copolymer is transferred as an aqueous dispersion into the inside of the tube. During a further drying step, the dispersant is removed and a continuous, water- and gas-impermeable barrier layer consisting of VDC copolymer is formed. The amount of the two fungicides applied to the external tube surface is about 220 mg/m$^2$, determined by gravimetry after dissolving it in methylene chloride. The percentages of the two compounds can be determined by UV spectroscopy by means of a previously drawn-up calibrating curve.

Sausage meat of the simmering sausage type (pork sausage) is filled into a tube segment tied on one side, and the open sausage casing end is sealed. The sausage is simmered in a conventional manner using hot water and cooled. To confirm the fungicidal action on the external surface layer, the sausage is provided with a dispersion of Example 1 which contains the mold spores, packaged air-tight in a polyethylene bag and stored under conventional conditions (2°-8° C.). After a storage period of 6 weeks, no mold infestation of the sausage casing is yet detectable.

A further advantage is the significantly reduced cellulose degradation by cellulolytic enzymes, which can be confirmed by the following laboratory test: 100 cm$^2$ of casing material are washed thoroughly for complete removal of plasticizer (propanediol, glycerol), dried at 110° C. for 3 hours and cooled in a dessicator. The sample is weighed, then comminuted and covered in a conical flask with 5 ml of a 0.1% strength by weight solution of cellulase from *Aspergillus niger* (produced by Fluka AG, Buchs, Switzerland)

95 ml of acetate buffer (pH 5) from 2.1 of an aqueous solution containing 82 g of sodium acetate and 60 g of acetic acid (100% strength).

After a 48-hour treatment at 39° C. in a drying cabinet, the comminuted sample is separated off from the solution, washed several times with water and dried at 110° C. for three hours, cooled, and the weight loss is determined. It is found that the loss of cellulose material as a result of the exposure to cellulase is 40% less than compared with an identical casing without external covering layer.

EXAMPLE 3

The external surface of a fiber-reinforced cellulose hydrate gel tube prepared according to Example 2 is provided in an analogous manner with an aqueous coating liquid of the following composition:

30 g/l of N-octylisothiazolone, dissolved in 200 g of propane-1,2-diol (octyl = n-octyl)
160 ml/l of an aqueous solution of epichlorohydrin/polyaminopolyamide resin (12.5% strength by weight, ® Resamine HW 601, produced by Cassella)
100 ml/l of glycerol The tube inner surface is provided analogously to Example 2 with an aqueous solution of a heat-curable cationic resin, which during the subsequent drying process is converted to its water-insoluble form and forms an adhesive impregnation for the subsequently prepared barrier layer consisting of VDC copolymer. This VDC copolymer inside layer is likewise prepared as described in Example 2.

The amount of the fungicide and the cationic resin applied as external covering layer is 60 mg/m$^2$ of cationic resin and 90 mg/m$^2$ of fungicide.

Sausage meat of the simmering sausage type (smoked sausage) is filled into sausage casing segments tied on one side, and the open end of the casing is sealed with a metal clip. The sausage obtained is simmered in a conventional manner using hot water, cooled and packaged aroma-tight in a plastic bag.

To confirm the fungicidal action of the outer surface layer of the sausage casing, a mold dispersion is present in the inside of the plastic bag analogously to Example 2.

After a storage period of 6 weeks in a cold room, the secondary packaging is removed. Even under these extreme storage conditions, no mold infestation is detectable on the outer surface of the sausage casing. The laboratory test to determine the enzymatic cellulose degradation carried out analogously to Example 2 shows that the loss of cellulose is 75% less than compared with an identical casing without outer covering layer.

The application of fungicidal heterocyclic compounds to the outer covering layer provided by the invention protects the foodstuff casing, which is based on cellulose or fiber-reinforced cellulose, from infestation by mold. The compounds can be perfectly adapted to the requirements of the various sausage casing types by introducing substituents or combining fungicides. Heterocyclic fungicidal compounds, in particular in combination with glycerol monolaurate and/or cationic resins, show excellent fungicidal action even after simmering using hot water. In particular in the case of long-lasting exposure of the ready-made sausage to large amounts of mold spores, fungicidal heterocyclic compounds prove to be more effective than the known agents which have previously been proposed for foodstuff casings made of cellulose. The fungicidal coating or impregnation shows an increased long-term effect under extreme storage conditions of the sausage. Long keeping sausage types can be kept mold-free for months in the proximity of sausages provided with noble molds. Even the dreaded problem of mold formation in the plastic bag during the storage in the case of secondary packaging of simmering sausages in plastic bags has been solved with the aid of the outer surface impregnation now found.

A further effect which is obtained by fungicidal heterocyclic compounds is the very good resistance to cellulose degradation by cellulolytic enzymes, in particular cellulase. As is known, these enzymes are formed by molds, but also by yeast and bacterial smear films, which are formed on the outer surface of the sausage in the case of insufficient ventilation. The degradation of cellulose by these enzymes, compared with uncoated casings, is reduced at least by 30% and, if the fungicides are combined with a cured cationic resin, even up to 80%.

What is claimed is:

1. A tubular cellulose hydrate foodstuff casing comprising an external covering layer or an impregnation, said layer or impregnation comprising a fungicidal heterocyclic compound which comprises (a) a benzimidazole substituted in the 2-position, (b) an isothiazolone substituted at the nitrogen atom or at at least one carbon atom by an alkyl group or at least one carbon atom by a halogen, or (c) a substituted isothiazolone containing a fused aromatic ring.

2. The casing as claimed in claim 1, wherein compound (c) is benzoisothiazolone.

3. The casing as claimed in claim 2, wherein said benzoisothiazolone compound (c) contains at least one substituent at the nitrogen atom or the benzene ring.

4. The casing as claimed in claim 1, wherein said benzimidazole compound comprises carbendazim, benomyl, fuberidazole or thiabendazole.

5. The casing as claimed in claim 1, wherein said compound (b) is substituted by at least one cycloalkyl or n-alkyl group.

6. The casing as claimed in claim 1, wherein said compound (c) is substituted by at least one cycloalkyl or n-alkyl group at the nitrogen atom or at the aromatic ring.

7. The casing as claimed in claim 1, wherein the halogen substituent of said compound (b) is a chlorine atom.

8. The casing as claimed in claim 7, wherein said chlorine atom is present at the carbon atom adjacent the sulfur atom of said compound (b).

9. The casing as claimed in claim 1, wherein said layer or impregnation further comprises glycerol monolaurate.

10. The casing as claimed in claim 1, wherein the total number of carbon atoms in the alkyl substituents of said fungicidal heterocyclic compound is less than or equal to 20.

11. The casing as claimed in claim 10, wherein said total number of carbon atoms is less than or equal to 14.

12. The casing as claimed in claim 10, wherein the N-alkyl substituent of said compound (b) or said compound (c) is an alicyclic or aliphatic straight-chain hydrocarbon radical.

13. The casing as claimed in claim 12, wherein said hydrocarbon radical is a cyclohexyl, methyl, ethyl, propyl, n-octyl, n-dodecyl or n-octadecyl group.

14. The casing as claimed in claim 1, wherein said compound (b) is substituted at at least one carbon atom by a straight-chain hydrocarbon radical having 1 to 4 carbon atoms.

15. The casing as claimed in claim 1, wherein said compound (b) is substituted at at least one carbon atom by a chlorine atom and at the nitrogen atom by alkyl group.

16. The casing as claimed in claim 1, wherein said layer or impregnation comprises a heat-cured cationic resin and at least one said fungicidal heterocyclic compound.

17. The casing as claimed in claim 16, wherein said resin is an epichlorohydrin/polyaminopolyamide resin.

18. The casing as claimed in claim 9, wherein the ratio in said layer or impregnation of the total amount of said compounds (a)–(c) to the total amount of glycerol monolaurate is from about 1:3 to 3:1, by weight.

19. The casing as claimed in claim 18, wherein said ratio is from 1:2 to 2:1.

20. The casing as claimed in claim 1, wherein said isothiazolone compounds (b)–(c) and benzimidazole compounds (a) are present in said layer or impregnation in the ratio (b)–(c):(a) from about 10:1 to 1:3, by weight.

21. The casing as claimed in claim 20, wherein said ratio is from 7:1 to 1:1.

22. The casing as claimed in claim 21, wherein said ratio is from 4:1 to 2:1.

23. The casing as claimed in claim 16, wherein the ratio of said cationic resin to said fungicide is about 1:1 to 10:1.

24. The casing as claimed in claim 23, wherein said ratio is 2:1 to 5:1.

25. A sausage product comprising a sausage meat emulsion and a casing as claimed in claim 1.

* * * * *